Patented Aug. 24, 1954

2,687,412

UNITED STATES PATENT OFFICE 2,687,412

PREPARATION OF ALKALI METAL PENICILLINATES

John C. Sheehan, Arlington Heights, Mass., and Max Tishler, Westfield, N. J., assignors to Merck & Co., Inc., Rahway, N. J., a corporation of New Jersey No Drawing. Application August 9, 1949, Serial No. 109,416

9 Claims. (Cl. 260—239.1)

This invention is concerned generally with novel processes for manufacturing therapeutically valuable salts of penicillin G. More particularly it relates to an improved method for the preparation of alkali metal salts of penicillin G in substantially pure form and in good yield from readily available starting materials.

This application is a continuation-in-part of our co-pending application Serial No. 780,588, filed October 17, 1947, now abandoned.

When penicillin G is prepared by microbiological fermentation processes, it is obtained in aqueous solution admixed with various other penicillins. Since penicillin G is superior to the other penicillins in the treatment of certain diseases, it is important to be able to prepare alkali metal salts of said penicillin G, in substantially pure form, uncontaminated by salts of the other penicillins. The preferred salt for therapeutic administration is the sodium salt of penicillin G.

Penicillin G can be separated from a mixture containing penicillin G admixed with other penicillins, in the form of a substantially pure amine salt. However, previously known methods for interconverting penicillin salts involve acidification of an aqueous solution of said salt, extraction into a solvent of the acid form of penicillin G, and transfer to aqueous solution by treatment with the base corresponding to the desired cation. This and similar procedures subject the penicillin to strongly acid and basic treatment in aqueous solution, under which conditions penicillin is easily destroyed.

It has been discovered, however, that alkali metal salts of penicillin G can be easily prepared from said amine salts in practically quantitative yield and using only substantially neutral reagents. This is accomplished by metathetically reacting the amine salt of penicillin G and an alkali metal thiocyanate in solution in an organic liquid. Since alkali metal salts of penicillin G are substantially insoluble in organic liquids, the alkali metal salt of penicillin G, formed by the above reaction, ordinarily precipitates and may be recovered by conventional means. Penicillin G is stable under the conditions employed in this reaction. Previously, it has always been considered necessary to carry out the interconversion of penicillin salts by processes employing refrigeration. When the present process is used, it is possible to carry out the reaction at a temperature of 25° C., or even higher, without appreciable decomposition of penicillin G. Furthermore, the present invention accomplishes the conversion to the important sodium salt and other alkali metal salts of penicillin G without use of the expensive freeze-drying step.

The starting materials herein employed include the salts of penicillin G with alkyl amines, for example, trimethyl amine, triethyl amine, and the like, or with heterocyclic amines, for example, N - methyl - piperidine, N-ethyl-piperidine, N-methyl-morpholine, N-ethyl-morpholine, and the like. Applicants prefer to use the tertiary amine salts of penicillin G since these compounds are readily prepared in pure form.

Any substantially anhydrous, substantially neutral polar organic liquid, which is non-reactive with the penicillin G, can be employed as the reaction solvent, since liquids of this class have a solvent action on the amine salts of penicillin G and on the alkali metal salt reactants. It is ordinarily preferred to employ chlorinated solvents, such as chloroform, $\beta,\beta'$-dichlorodialkyl ethers, and the like, nitroparaffins, such as nitromethane, dialkylketones, such as acetone, methylethyl ketone, and the like, esters, such as ethyl acetate, alcohols, such as butanol, 2-ethyl-butanol, and the like, nitriles, such as acetonitrile, as well as mixtures containing two or more different solvents.

Any alkali metal thiocyanate, such as sodium thiocyanate, lithium thiocyanate, potassium thiocyanate, and the like, can be used since salts of this class yield a solution containing the corresponding cation when mixed with polar organic liquids. The reaction is best conducted, however, utilizing an alkali metal thiocyanate having a solubility in the organic liquid employed substantially greater than the solubility of the corresponding metal salt of penicillin G. When an alkali metal thiocyanate having the requisite solubility in the organic liquid employed is reacted with an amine salt of penicillin G, employing merely sufficient organic liquid to produce a substantially saturated solution of said alkali metal thiocyanate, the corresponding alkali metal salt of penicillin G formed by metathesis necessarily precipitates and the reaction proceeds, due to mass action, substantially to completion.

The reaction is conveniently carried out by adding a solution of one of the reactants, with stirring, to a solution containing the other reactant, under which conditions the alkali metal salt of penicillin G, formed by the reaction, ordinarily precipitates and can be recovered by conventional means. It should be understood, however, that any method of bringing the alkali metal thiocyanate and the amine salt of penicillin G together in a polar organic liquid is within the scope of this invention. The crystalline alkali metal salt of penicillin G is ordinarily recovered by filtration or centrifugation and is washed thoroughly with the reaction solvent or other substantially anhydrous organic liquid which is a solvent for the by-product amine salt formed by the metathesis. The product can then be dried at room temperature or above, but preferably in vacuo, to produce, in substantially pure form, the alkali metal salt of penicillin G. The product can be further purified, if desired, by recrystallization from a solvent, such as an aqueous dialkyl ketone.

The following example illustrates a method of carrying out the present invention, but it is to be understood that this example is given by way of illustration and not of limitation.

*Example*

A solution of 5 g. of the N-ethyl-piperidine salt of penicillin G in 23 ml. of chloroform was added to a solution of 1 g. of sodium thiocyanate in 23 ml. of acetone. After one hour the crystalline sodium penicillin G was collected by filtration, washed with acetone, and dried; weight 3.78 g.; yield 95%.

Modifications may be made in carrying out the present invention without departing from the spirit and scope thereof. Insofar as these changes and modifications are within the purview of the annexed claims, they are to be considered as part of our invention.

We claim:

1. The process of preparing alkali metal salts of penicillin G which comprises metathetically reacting, in solution in organic solvent, an amine salt of penicillin G and an alkali metal thiocyanate having a solubility in said organic solvent substantially greater than the solubility of the corresponding metal salt of penicillin G.

2. The process of preparing alkali metal salts of penicillin G which comprises metathetically reacting, in solution in organic solvent, the N-ethyl-piperidine salt of penicillin G and an alkali metal thiocyanate having a solubility in said organic solvent substantially greater than the solubility of the corresponding metal salt of penicillin G.

3. The process of preparing the sodium salt of penicillin G which comprises reacting the N-ethyl-piperidine salt of penicillin G with sodium thiocyanate, said reaction being carried out in solution in a substantially anhydrous organic solvent comprising chloroform.

4. The process of preparing the lithium salt of penicillin G which comprises reacting the N-ethyl-piperidine salt of penicillin G with lithium thiocyanate, said reaction being carried out in solution in a substantially anhydrous organic solvent comprising chloroform.

5. The process of preparing the potassium salt of penicillin G which comprises reacting the N-ethyl-piperidine salt of penicillin G with potassium thiocyanate, said reaction being carried out in solution in a substantially anhydrous organic solvent comprising chloroform.

6. The process of preparing the sodium salt of penicillin G which comprises bringing together a chloroform solution containing the N-ethyl-piperidine salt of penicillin G and an acetone solution containing sodium thiocyanate, thereby precipitating the substantially insoluble sodium salt of penicillin G.

7. Process for the formation of an alkali metal salt of penicillin which comprises metathetically reacting a tertiary amine salt of penicillin with an alkali metal thiocyanate in a lower alkanol solution.

8. Process for the formation of sodium penicillin which comprises metathetically reacting triethyl amine salt of penicillin with sodium thiocyanate in a lower alkanol solution.

9. Process for the formation of an alkali metal salt of penicillin, which comprises metathetically reacting a tertiary amine salt of penicillin with an alkali metal thiocyanate in a lower alkanone solution.

No references cited.